(12) United States Patent
Conrad

(10) Patent No.: US 12,090,437 B2
(45) Date of Patent: *Sep. 17, 2024

(54) MULTIUSE HOME STATION

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,235

(22) Filed: Sep. 19, 2023

(65) Prior Publication Data

US 2024/0009611 A1 Jan. 11, 2024

Related U.S. Application Data

(63) Continuation of application No. 17/157,608, filed on Jan. 25, 2021, now Pat. No. 11,794,141.

(51) Int. Cl.
*A47L 9/28* (2006.01)
*B01D 45/16* (2006.01)
*B01D 45/18* (2006.01)
*B01D 46/00* (2022.01)
*B01D 46/02* (2006.01)
(Continued)

(52) U.S. Cl.
CPC ........... *B01D 46/48* (2013.01); *A47L 9/2873* (2013.01); *B01D 45/16* (2013.01); *B01D 45/18* (2013.01); *B01D 46/0043* (2013.01); *B01D 46/02* (2013.01); *H02J 7/0044* (2013.01); *A47L 2201/022* (2013.01); *A47L 2201/024* (2013.01); *B01D 2273/30* (2013.01)

(58) Field of Classification Search
CPC ........ B01D 46/48; B01D 45/16; B01D 45/18; B01D 46/0043; B01D 46/02; B01D 2273/30; A47L 9/2873; A47L 2201/022; A47L 2201/024; H02J 7/0044; H02J 50/10; H02J 7/0042; F24F 8/00; F24F 2221/18

See application file for complete search history.

(56) References Cited

U.S. PATENT DOCUMENTS 4,201,256 A * 5/1980 Truhan ................... B01D 45/12
 144/252.2
4,225,814 A 9/1980 Gantz et al.
(Continued)

FOREIGN PATENT DOCUMENTS

DE 102011054162 A1 4/2013
EP 3033982 A1 6/2016
(Continued)

OTHER PUBLICATIONS

English machine translation of JP2004283327A, published on Oct. 14, 2004.
(Continued)

*Primary Examiner* — Dung H Bui
(74) *Attorney, Agent, or Firm* — Philip C. Mendes da Costa; BERESKIN & PARR LLP/ S.E.N.C.R.L., s.r.l.

(57) ABSTRACT

A multiuse home station includes a vacuum cleaner docking station, a vacuum cleaner charging station, and a room air cleaner unit, wherein the room air unit uses a portion of the vacuum cleaner docking station.

17 Claims, 6 Drawing Sheets

(51) Int. Cl.
 B01D 46/48 (2006.01)
 H02J 7/00 (2006.01)

(56) References Cited

U.S. PATENT DOCUMENTS

| | | | | |
|---|---|---|---|---|
| 5,606,767 | A | * | 3/1997 | Crlenjak ............... B24B 55/06 15/301 |
| 5,716,260 | A | * | 2/1998 | Griffin .................. B24C 9/006 451/92 |
| 5,787,545 | A | | 8/1998 | Colens |
| 6,076,226 | A | | 6/2000 | Reed |
| 6,122,796 | A | | 9/2000 | Downham et al. |
| 6,833,016 | B2 | * | 12/2004 | Witter .................. B04C 5/13 55/346 |
| 7,282,074 | B1 | * | 10/2007 | Witter .................. B24B 55/06 451/87 |
| 7,837,958 | B2 | | 11/2010 | Crapser et al. |
| 8,572,799 | B2 | | 11/2013 | Won et al. |
| 9,027,199 | B2 | | 5/2015 | Jung et al. |
| 9,271,618 | B2 | | 3/2016 | Mantyla et al. |
| 9,302,294 | B2 | * | 4/2016 | Starke ................... B07B 13/14 |
| 9,808,135 | B2 | | 11/2017 | Mantyla et al. |
| 9,874,873 | B2 | | 1/2018 | Angle et al. |
| 9,901,235 | B2 | | 2/2018 | Li et al. |
| 10,188,255 | B2 | | 1/2019 | Lee et al. |
| 10,427,085 | B2 | | 10/2019 | Kim et al. |
| 10,610,073 | B1 | | 4/2020 | Lucas |
| 10,688,652 | B2 | | 6/2020 | Hummel |
| 10,709,308 | B2 | | 7/2020 | Buehler et al. |
| 10,886,763 | B1 | * | 1/2021 | Ha ........................ H02J 7/0044 |
| 2004/0255425 | A1 | | 12/2004 | Arai et al. |
| 2005/0022331 | A1 | | 2/2005 | Kim et al. |
| 2005/0091784 | A1 | | 5/2005 | Bone |
| 2005/0150519 | A1 | | 7/2005 | Keppler et al. |
| 2005/0166352 | A1 | | 8/2005 | Keppler et al. |
| 2007/0157415 | A1 | | 7/2007 | Lee et al. |
| 2007/0157416 | A1 | | 7/2007 | Lee et al. |
| 2007/0157420 | A1 | | 7/2007 | Lee et al. |
| 2007/0226949 | A1 | | 10/2007 | Hahm et al. |
| 2007/0245511 | A1 | | 10/2007 | Hahm et al. |
| 2008/0056933 | A1 | | 3/2008 | Moore et al. |
| 2008/0201895 | A1 | | 8/2008 | Kim et al. |
| 2009/0049640 | A1 | | 2/2009 | Lee et al. |
| 2013/0335900 | A1 | * | 12/2013 | Jang ...................... A47L 5/24 361/679.01 |
| 2015/0135470 | A1 | | 5/2015 | Mantyla et al. |
| 2016/0183752 | A1 | * | 6/2016 | Morin .................. A47L 9/2805 15/340.1 |
| 2017/0164800 | A1 | | 6/2017 | Arakawa |
| 2017/0196430 | A1 | | 7/2017 | Machida et al. |
| 2018/0029809 | A1 | | 2/2018 | Lee et al. |
| 2018/0177369 | A1 | | 6/2018 | Morin et al. |
| 2018/0199776 | A1 | | 7/2018 | Sato et al. |
| 2019/0085852 | A1 | | 3/2019 | Porras et al. |
| 2019/0092179 | A1 | | 3/2019 | Kwa et al. |
| 2020/0022553 | A1 | | 1/2020 | Mathieu et al. |
| 2020/0069139 | A1 | | 3/2020 | Johnson et al. |
| 2020/0101574 | A1 | | 4/2020 | Caspar |
| 2020/0170468 | A1 | | 6/2020 | Nakayama et al. |
| 2020/0179952 | A1 | | 6/2020 | Conrad |
| 2020/0225673 | A1 | | 7/2020 | Ebrahimi Afrouzi et al. |
| 2020/0229667 | A1 | | 7/2020 | Yun et al. |
| 2020/0275815 | A1 | | 9/2020 | Ogihara et al. |
| 2020/0281427 | A1 | | 9/2020 | Vitz et al. |
| 2020/0281428 | A1 | | 9/2020 | Vitz et al. |
| 2020/0297180 | A1 | | 9/2020 | Kang et al. |
| 2020/0305670 | A1 | * | 10/2020 | Kim ....................... B60L 53/66 |
| 2020/0329933 | A1 | | 10/2020 | Hackert et al. |
| 2020/0345195 | A1 | | 11/2020 | Zhou |
| 2021/0038034 | A1 | | 2/2021 | Na et al. |
| 2021/0068603 | A1 | | 3/2021 | Cho et al. |
| 2021/0089040 | A1 | | 3/2021 | Ebrahimi Afrouzi et al. |
| 2021/0126478 | A1 | | 4/2021 | Park et al. |
| 2021/0156993 | A1 | | 5/2021 | Gordon et al. |
| 2022/0061612 | A1 | | 3/2022 | Wolff et al. |
| 2022/0175206 | A1 | | 6/2022 | Li et al. |
| 2022/0218168 | A1 | | 7/2022 | Shi et al. |
| 2022/0218170 | A1 | | 7/2022 | Wang |

FOREIGN PATENT DOCUMENTS

| | | |
|---|---|---|
| JP | 2004283327 A | 10/2004 |
| JP | 6119915 B2 | 4/2017 |
| WO | 2006058125 A2 | 6/2006 |
| WO | 2020223619 A1 | 11/2020 |
| WO | 2022124782 A1 | 6/2022 |

OTHER PUBLICATIONS

English machine translation of JP3119915U, published on Mar. 16, 2006.

English machine translation of DE102011054162A1, published on Apr. 4, 2013.

* cited by examiner

MULTIUSE HOME STATION

CROSS-REFERENCE

This application is a continuation of U.S. patent application Ser. No. 17/157,608, which was filed on Jan. 25, 2021, and which is allowed, the disclosure of which is incorporated herein in its entirety.

FIELD

This disclosure relates generally to multiuse home stations for use with at least two appliances, and particularly to a multiuse home station for use with at least one cleaning appliance.

INTRODUCTION

The following is not an admission that anything discussed below is part of the prior art or part of the common general knowledge of a person skilled in the art.

Many different cleaning appliances have been developed for use in cleaning homes and other spaces. Often, each appliance is designed for a particular use or type of cleaning. Accordingly, many homeowners accumulate a plurality of appliances for a plurality of cleaning needs. For example, a homeowner may have a robot vacuum for daily floor cleaning, a steam mop for wet floor cleaning, a stick vacuum for above-floor and quick cleaning, and a room air cleaner for continuous air cleaning.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

A multiuse home station may combine into a single station the functions of two or more appliances. In one particular embodiment, the multiuse home station incorporates the functions of one or more other household appliances into the docking station for a robot vacuum. Alternately, or in addition, the multiuse home station may provide a base for use with one or more other household appliances.

As the number of cleaning appliances multiplies, so does the total cost of these products and the total space needed to store these appliances. Further, many of these appliances have components that could be a common component that has more than one function.

For example, if a user has a robot vacuum, then floor space is already required for the docking station. The robot station could utilize the existing floor plate to provide additional functionality and thereby avoid the need to provide floor space or tabletop space for other appliances.

Accordingly, since a docking station for a robot vacuum may incorporate an air moving member and an air treatment member to receive dust and other material collected by a robot vacuum, the air moving member and the air treatment member could be part of a room air cleaner that is built into the docking station. In such an embodiment, the multiuse home station comprises components that provide part or all of the function of a first appliance (e.g., the docking station for a robot vacuum) and part or all of the function of a second appliance (e.g., a room air cleaner) that is different from the first appliance. Accordingly, the multiuse home station may use some or all of the components that provide the function for the first appliance and the multiuse home station may use some or all of those components to provide a unit that functions as the second appliance (e.g., a room air cleaner).

Similarly, as a docking station for a robot vacuum may be plugged into a household electrical outlet, the docking station typically has a charging port for a robot vacuum cleaner. Therefore, the docking station could provide a charging station for other appliances (e.g., a hand vacuum cleaner, a wireless charging pad for a smartphone or a tablet, a charging station for a flashlight, etc.) and/or have a power outlet for other appliances, which could be 110/240V outlets, 12V outlets and/or USB outlets.

It will be appreciated that the air treatment member of a docking station for a robot vacuum has a dirt collection region and this region may be used for additional purposes so as to function as a shared dirt receiving region. The shared dirt receiving region may be useable by at least two appliances. Accordingly, a user may be able to dispose of dirt from more than one appliance by emptying or removing only the one shared dirt receiving region. For example, the shared dirt receiving region may be used to receive dirt from a canister vacuum cleaner, an upright vacuum cleaner or a handheld vacuum cleaner in addition to, e.g., a robot vacuum. Alternately, or in addition, it may be used as a garbage can for a room.

Alternately, or in addition, the air moving member and the air treatment member of a docking station for a robot vacuum may be used to provide components of a vacuum cleaner. For example, a rigid extension wand and/or a flexible hose may be part of, or connectable to, a multiuse hose station to provide above floor functionality. Alternately or in addition, the air moving member and the air treatment member of a docking station for a robot vacuum may be provided in a removable housing that functions as a portable vacuum cleaner. Accordingly, the multiuse home station may include at least one station associated with a robot vacuum and also provide a vacuum cleaner unit that is removably mounted as part of the docking station and/or is useable in situ in the docking stations with, e.g., a rigid extension wand and a flexible hose. Thus, the multiuse home station may provide improvements (e.g., in convenience or cost) without a corresponding loss in functionality.

The multiuse home station may include a disinfection unit. The disinfection unit may be configured to store and/or generate and use a disinfectant agent (e.g., an alcohol solution, ozone, ultraviolet radiation, peroxide, an oxide, quaternary ammonium, or ions from an air ionizer). The multiuse home station may itself be adapted to use (disperse) the disinfection agent to disinfect the air in a room and/or a surface (e.g., a surface of an appliance or a surface in a room such as a floor or wall) and/or provide the disinfectant agent to an appliance (such as a robot vacuum) which may itself use the disinfection agent to disinfect the air in a room and/or a surface. The disinfection agent may be applied during a low-traffic time period.

The multiuse home station may be configured to redistribute heat in a room. For example, the multiuse home station may selectively draw air from an upper end of a room or from a lower end of the room and/or exhaust air to the upper end of the room or to the lower end of the room. An advantage of this aspect is that the multiuse home station may draw relatively hotter air from the upper portion of the room when the room temperature is generally cooler than desired (e.g., in winter) and from the lower portion of the room when the room temperature is generally higher than desired (e.g., in summer).

The multiuse home station may be integrated into a living space. The multiuse home station may be shaped to fit underneath common furniture items (e.g., in a location that is at least partially out of sight while still providing direct access from the autonomous surface cleaning apparatus (robot vacuum) docking station to the floor). The multiuse home station may be incorporated into common furniture items (e.g., the multiuse home station may form a bookshelf or a stand for a television screen). An advantage of this aspect is that the multiuse home station may be positioned in a convenient location (e.g., a location readily accessed by the user and/or in a position where an autonomous appliance is able to directly access the necessary surfaces) without appearing out of place or taking up additional space.

The multiuse home station may be a modular station. The multiuse home station may be configured to allow one or more (e.g., a plurality) of units or stations to be removed, added and/or replaced over the lifetime of the multiuse home station. Accordingly, the multiuse home station may be continuously used even as one or more units or stations break down or become outdated.

In accordance with one aspect of this disclosure, there is provided a multiuse home station comprising:
(a) an autonomous surface cleaning apparatus docking station, the autonomous surface cleaning apparatus docking station comprises an air flow passage from an autonomous surface cleaning apparatus docking station port to a clean air outlet with an air treatment and air movement unit provided in the air flow passage, the air treatment and air movement unit comprises a suction motor and fan assembly and an air treatment member;
(b) an autonomous surface cleaning apparatus charging station; and,
(c) a room air cleaner unit, wherein the room air unit uses a portion of the autonomous surface cleaning apparatus docking station.

In any embodiment, the air flow passage may comprise a first upstream portion extending between the autonomous surface cleaning apparatus docking station port and the air treatment and air movement unit and a downstream portion extending between the air treatment and air movement unit and the clean air outlet port, and the room air cleaner unit may utilize the air treatment and air movement unit.

In any embodiment, the room air cleaner unit may comprise a second air flow passage extending from a room air inlet towards the air treatment and air movement unit.

In any embodiment, the air treatment member may comprise a dirt receiving region and the multiuse home station may further comprise an openable lid wherein, when the lid is opened, the dirt receiving region is opened whereby the dirt receiving region is useable as a room garbage can.

In any embodiment, the multiuse home station may further comprise a hand vac unit that comprises a hand vac docking station.

In any embodiment, the hand vac docking station may comprise a second air flow passage extending from a hand vac inlet and extending towards the air treatment and air movement unit whereby the hand vac unit utilizes the air treatment and air movement unit.

In any embodiment, the hand vac docking station may comprise a hand vac charging station.

In any embodiment, the multiuse home station may further comprise an above floor cleaning unit that comprises a rigid cleaning wand and a flexible hose wherein the air flow passage comprises a first upstream portion extending between the autonomous surface cleaning apparatus docking station port and the air treatment and air movement unit and a downstream portion extending between the air treatment and air movement unit and the clean air outlet port, and a second air flow passage extending from a above floor inlet towards the air treatment and air movement unit wherein the above floor cleaning unit utilizes the air treatment and air movement unit.

In any embodiment, the multiuse home station may further comprise a secondary charging station.

In any embodiment, the secondary charging station may comprise a recharging station for at least one of a smart phone, a tablet, a flashlight and a hand vacuum cleaner.

In any embodiment, the secondary charging station may comprise a USB port.

In any embodiment, the multiuse home station may further comprise one or more of a Wi-Fi repeater, a room light and a surge protected electrical outlet.

In any embodiment, the multiuse home station may further comprise an autonomous surface cleaning apparatus wherein the autonomous surface cleaning apparatus comprises a disinfection unit or an air cleaner unit.

In accordance with another aspect of this disclosure, there is provided a multiuse home station comprising:
(a) an autonomous surface cleaning apparatus docking station;
(b) an autonomous surface cleaning apparatus charging station; and,
(c) a secondary charging station.

In any embodiment, the secondary charging station may comprise a recharging station for at least one of a smart phone, a tablet, a flashlight and a hand vacuum cleaner.

In any embodiment, the secondary charging station may comprise a wireless charging pad.

In accordance with another aspect of this disclosure, there is provided a multiuse home station comprising:
(a) an autonomous surface cleaning apparatus docking station, the autonomous surface cleaning apparatus docking station comprises an air flow passage from an autonomous surface cleaning apparatus docking station port to a clean air outlet with an air treatment and air movement unit provided in the air flow passage, the air treatment and air movement unit comprises a suction motor and fan assembly and an air treatment member;
(b) an autonomous surface cleaning apparatus charging station; and,
(c) a secondary vacuum unit operable independently of an autonomous surface cleaning apparatus, wherein the secondary vacuum unit uses a portion of the autonomous surface cleaning apparatus docking station.

In any embodiment, the secondary vacuum unit may comprise a cordless portable vacuum cleaner.

In any embodiment, the air flow passage may comprise a first upstream portion extending between the autonomous surface cleaning apparatus docking station port and the air treatment and air movement unit and a downstream portion extending between the air treatment and air movement unit and the clean air outlet port, and the secondary vacuum unit may comprise a flexible hose and wand assembly upstream of the air treatment and air movement unit.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
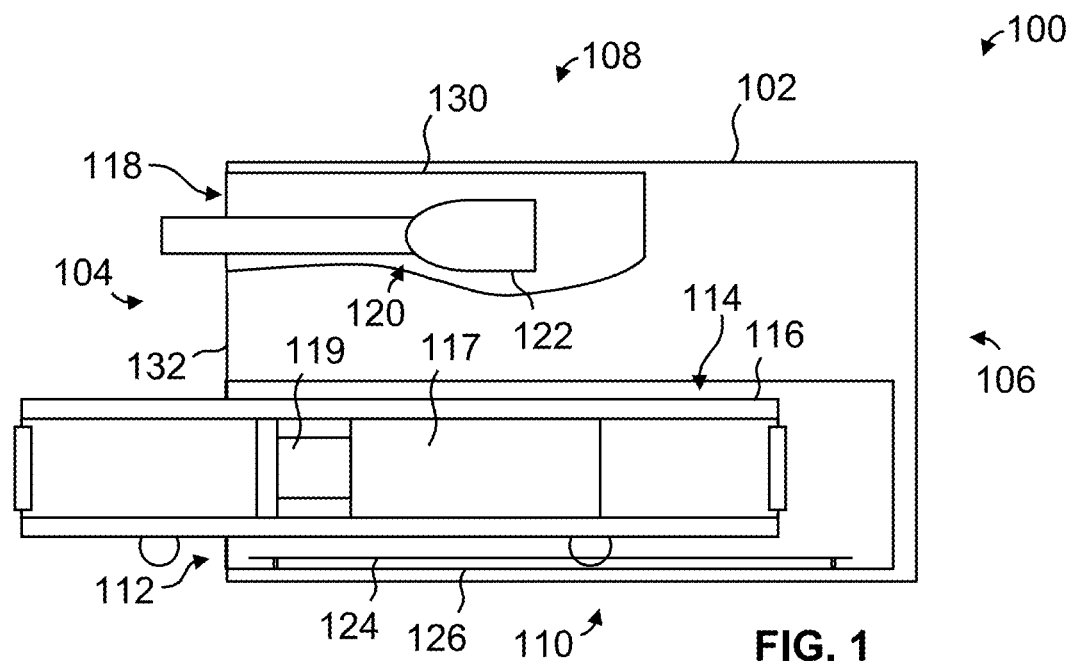
FIG. 1 is a schematic diagram of an embodiment of a multiuse home station.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method, or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

General Description of a Multiuse Home Station

As exemplified in FIG. 1, a multiuse home station 100 has a main housing 102 having a front end 104, a rear end 106, a top end 108, and a bottom end 110. The main housing 102 is depicted as having a rectangular cross section in FIG. 1, however the main housing 102 may be of any shape (e.g., cubic, cylindrical, or irregular).

The multiuse home station 100 combines into a single station a docking station and/or charging station for at least one household appliance and/or one or more components that by themselves, or in combination with one or more other components that are removably connectable to the multiuse home station 100, produce a unit that fulfills the function of a household appliance.

As used herein, a docking station refers to a portion of the multiuse home station 100 at which an appliance (or a subassembly that, together with one or more of the components of the multiuse home station 100, provide the function of a household appliance) may be removably connected to transfer material (e.g., one or more of dirt, air, liquid, etc.) from the appliance to the multiuse home station 100. For example, the docking station may be a docking station for an autonomous surface cleaning apparatus.

As used herein, a charging station refers to a portion of the multiuse home station 100 which provides an interface to charge one or more household appliances). For example, the charging station may be a charging station for a handheld surface cleaning apparatus, an autonomous surface cleaning apparatus, a flashlight, a smart phone, a tablet, or the like.

As used herein, a unit refers to one or more components of the multiuse home station 100 which by itself or in combination with one or more components of the multiuse home station 100 or that are removably connectable to the multiuse home station 100, provides the function of a household appliance. For example, a unit may be a room light provided as part of the multiuse home station 100. Alternately, or in addition, the air treatment member and the air movement member of a docking station for an autonomous surface cleaning apparatus may be operable to also function as a room air cleaner and thereby provide a room air cleaner unit that is part of the multiuse home station 100. Alternately, or in addition, the air treatment member and the air movement member of a docking station for an autonomous surface cleaning apparatus may be operable in combination with a retractable hose (which may be stored in the multiuse home station 100, or removably connectable to a docking station, to function as a central surface cleaning apparatus and thereby provide a central surface cleaning apparatus unit.

Accordingly, for example, the multiuse home station 100 may incorporate a first station (e.g., a docking station or charging station for an autonomous surface cleaning apparatus) and/or a first unit (e.g., a retractable hose and air moving unit for a central surface cleaning apparatus) with a second unit (e.g., a room air cleaner unit) and/or a second station (e.g., a charging station for a flashlight and/or a mobile device).

Combining at least one unit or station with at least one unit or station with a second unit or station in the single multiuse home station 100 may reduce the total space used. It may also, or alternatively, allow the appliances to share the use of one or more components of the multiuse home station 100. Combining at least one unit or station with at least one second unit or station in the single multiuse home station 100 may facilitate ease of use (e.g., by essentially having two appliances in the same location so the user does not forget where they are stored).

Optionally, the multiuse home station 100 may include at least one unit or station associated with a cleaning appliance (e.g. an autonomous surface cleaning apparatus, a stick vacuum cleaner, a central vacuum cleaner, a hand vacuum cleaner or a steam mop). An advantage of incorporating a unit or station of a cleaning appliance is that many cleaning appliances require a station of some sort, and the station is often placed in an easy-access location in a home. For example, a docking station for an autonomous surface cleaning apparatus is placed in the living space of a home (i.e. not stored in a closet or cupboard or other hidden location) so that the autonomous surface cleaning apparatus may be emptied and recharged. Integrating a second unit or station with a robot docking station may save space and may enable components of the robot docking station to provide some or all of the functions of another household appliance. Further using components of a cleaning station such as a docking station for an autonomous surface cleaning apparatus to provide some or all of the function of another household appliance (e.g., a room air cleaner) may allow for shared use of one or more features of the multiuse home station 100 (e.g., a suction fan), as discussed further elsewhere herein.

Many cleaning appliances also require the use of features that could be used with other appliances, such as electrical power. For example, an autonomous surface cleaning apparatus may require a charging station at which an on-board power supply of the autonomous surface cleaning apparatus can be recharged (e.g., from a household current available at the charging station or from a power storage device of the charging station). Accordingly, a multiuse home station 100 that has a cleaning appliance station may be used to operate and/or charge other appliances.

In the simple exemplary embodiment of FIG. 1, the multiuse home station 100 includes at least one station for each of at least two different appliances. The exemplary multiuse home station 100 of FIG. 1 includes a first docking station 112 for a first appliance 114 (in this case, an autonomous surface cleaning apparatus 116 having an on board air treatment member 117 and an on board air moving unit 119) and a second docking station 118 for a second appliance 120 (in this case a flashlight 122). As exemplified, a station may include a cradle for holding a docked appliance (e.g., the flashlight 122) and/or a docking station port through which a dirt receiving area in the appliance may be joined to the multiuse home station 100 such that the multiuse home station 100 may evacuate the dirt receiving area.

In the exemplary embodiment of FIG. 1, the first docking station 112 includes a first cradle 124 for receiving the first appliance 114. In the exemplary embodiment of FIG. 1, the first cradle 124 is configured to releasably connect the first appliance in fluid flow communication with the multiuse home station). In the exemplary embodiment of FIG. 1, the first cradle 124 is a retractable cradle that may be retracted into the floor 126 of the first docking station 112 to allow the autonomous surface cleaning apparatus 116 to move in and out, and extended up from the floor 126 of the first docking station 112 (as depicted in FIG. 1) to hold the autonomous surface cleaning apparatus 116 when the autonomous surface cleaning apparatus 116 is at rest. It will be appreciated that the first cradle 124 may be any interface known in the robotic vacuum cleaner arts for enabling an autonomous surface cleaning apparatus with a robot docking station. The second docking station 118 includes a second cradle 130 for receiving and optionally holding the second appliance 120. In the exemplary embodiment of FIG. 1, the second cradle 130 is a shaped pocket (e.g., a pocket in a wall 132 of the main housing 102) to securely hold the second appliance 120. Combining two stations into the multiuse home station 100 may reduce the total space used to store the two associated appliances and/or facilitate ease of use (e.g., by having the two appliances in the same location). It will be appreciated that the second docking station may provide an interface for charging the flashlight 122, in which case the second docking station would be a charging station. It will also be appreciated that if the flashlight 122 were a hand vacuum cleaner, then the second docking station 118 could connect the hand vacuum cleaner in fluid flow communication with the air treatment member and suction motor associated with the first docking station 112.

The multiuse home station 100 may include at least one unit or station associated with a first or primary cleaning appliance and at least one unit or station associated with a second cleaning appliance different from the first (i.e., at least two cleaning appliances). An advantage of including a unit or station for each of two different cleaning appliances is that many cleaning appliances make use of the same or similar features and can share the use of a feature. For example, many cleaning appliances make use of an air moving member and/or an air treatment member. Utilizing these components, e.g., as a docking station to empty two different cleaning appliances, may allow for shared use of one or more components of the multiuse home station 100, as discussed further elsewhere herein. It will be appreciated that each of the first and second cleaning appliances may be a vacuum cleaning unit and may make use of a shared air moving member (concurrent and/or sequential use), as discussed further elsewhere herein.

The units or stations of the multiuse home station 100 may be arranged in any configuration relative to one another. As in the exemplary embodiment of FIG. 1, the units or stations may be vertically stacked, which may facilitate reducing the footprint of the multiuse home station 100 in a room.

The main housing 102 may optionally be customizable. For example, the main housing 102 may be magnetic such that a user may apply magnets to decorate the main housing 102. The man housing may include one or more panels or shells which can be replaced, such that a user may choose the color or outer appearance of the main housing 102.

As discussed subsequently, a powered multiuse home station 100 may also be able to integrate one or more of a great variety of features, appliances, and/or powered apparatus. For example, a powered multiuse home station 100 may include one or more Wi-Fi repeaters, audio video entertainment centers, speakers, processors running virtual assistants (e.g., Siri™), screens, projectors, lighted picture frames, carbon monoxide detectors, smoke detectors, baby cameras, room lights (i.e. light fixtures for illuminating a room), security system motion detectors, and/or power output units 140 (e.g., an electrical outlet, such as a surge-protected electrical outlet).

Multiuse Home Station with on Board Power

In accordance with this aspect, the multiuse home station 100 may have an on board energy source and may therefore function as an uninterruptible power supply This aspect may be used by itself or in combination with one or more of the other aspects set out herein.

An advantage of this design is that the multiuse home station 100 may optionally be situated at a location at which it does not have to be plugged into a household electrical outlet at all times. Further, in case of a power failure, the multiuse home station 100 may house, e.g., a flash light, which itself may have an on board power supply that is maintained in a charged state by the multiuse home station 100.

Figure 2:
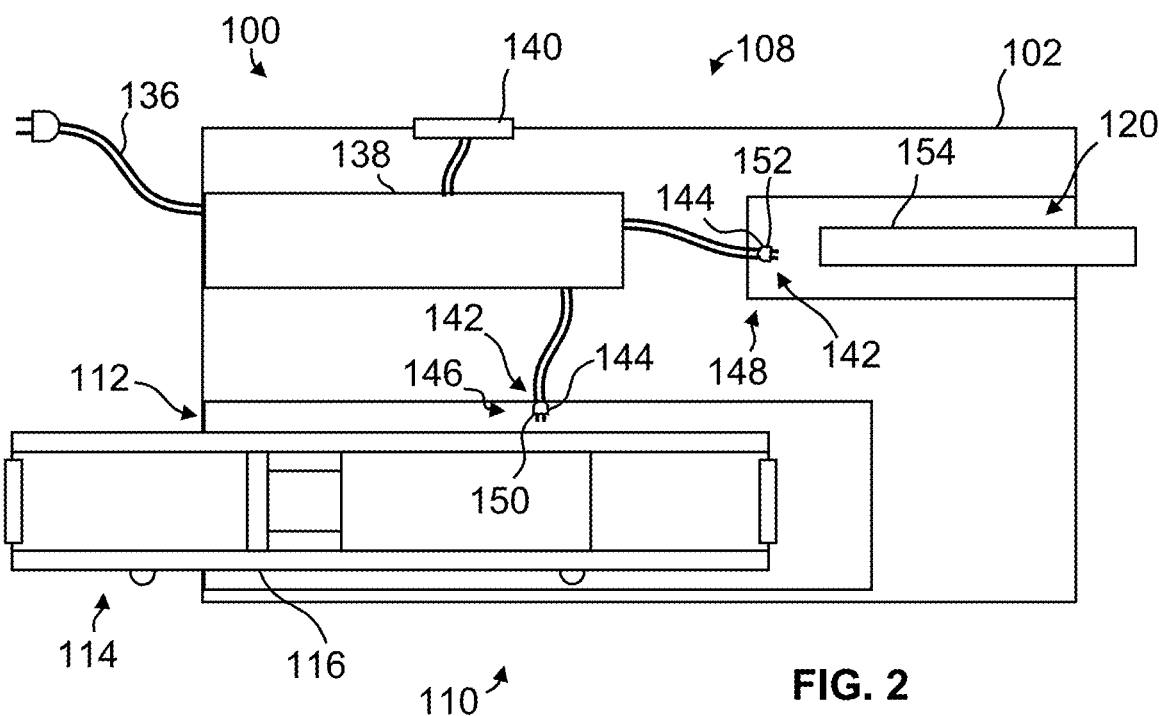
FIG. 2 is a schematic diagram of an alternate embodiment of a multiuse home station.

As exemplified in FIG. 2, the multiuse home station 100 may be powered using household current. Accordingly, the multiuse home station 100 may include a power cord 136. The power cord 136 may be provided at any location on the multiuse home station 100, such as at the top end 108 (e.g., to allow a user to easily reach the power cord without stooping; as illustrated in FIG. 1) or the bottom end 110 (e.g., to allow the power cord to be more easily joined to a household electrical outlet that is located near a lower end of a household wall). An advantage of using household current is that the multiuse home station 100 may have a continuous power supply without needing to be recharged.

In accordance with this aspect, the multiuse home station 100 may alternately or in addition be powered by one or more on-board energy storage members 138 (e.g. one or more rechargeable or replaceable batteries, supper-capacitors, fuel cells, or hydrogen combustion engines or turbines). An advantage of the on-board energy storage member is that the multiuse home station 100 may be able to provide power even when and/or where a household current is unavailable (e.g., during a power outage or in a location where no household outlet is located).

As exemplified in FIG. 2, the multiuse home station 100 includes both the power cord 136 and the on-board energy storage member 138 (in this case, a rechargeable battery). An advantage of the multiuse home station 100 powered by household current and including at least one on-board energy storage device 138 is that the multiuse home station 100 may use household current while that is available and may use current from an on-board energy storage device 138 when household current is unable. In some examples, the multiuse home station 100 may include and/or function as an uninterruptable power supply (UPS).

Multiple Charging Stations

In accordance with this aspect, the multiuse home station 100 includes at least a first charging station 146 (also referred to as a first recharging station or primary recharging station) for use with the first appliance 114 and a second charging station 148 (also referred to as a second recharging station or secondary recharging station) for use with a second appliance 120. This aspect may be used by itself or in combination with one or more of the other aspects set out herein.

An advantage of this aspect is that both the primary and secondary charging stations 146, 148 may make use of the power available through the multiuse home station 100. As exemplified in FIG. 2, the primary charging station 146 and the secondary charging station 148 may each be coupled to the power cord 136 and/or on-board energy storage member (s) 138 of the multiuse home station 100 to receive power therefrom.

In accordance with this aspect, the multiuse home station 100 may be configured to provide power to two or more appliances. For example, the multiuse home station 100 may have two or more charging stations. Each charging station may have electrical contacts that are electrically couplable to mating electrical contacts on an appliance the is removably dockable to the multiuse home station 100 (e.g., a charging station for an autonomous surface cleaning apparatus as is known in the art), an electrical outlet for receiving a power cord, USB cord or the like or a wireless charging pad. Optionally, the multiuse home station 100 may have two or more charging stations which use electrical contacts, two or more electrical outlets or to or more wireless charging pads.

Accordingly, the multiuse home station 100 may provide continuous power to one or more appliances that are tethered to the multiuse home station 100 by a power cord. Alternately, or in addition, the multiuse home station 100 may provide power to an appliance while the appliance is electrically coupled, e.g., docked, to a charging station). Accordingly, a user having two or more appliances may only need to concern themselves with ensuring that the multiuse home station 100 is powered (i.e., plugged in to a household electrical outlet and/or that an on-board energy storage member(s) is charged, and/or a fuel tank(s) filled with fuel). For example, the user may need only to concern themselves with ensuring that the multiuse home station 100 is powered, knowing that the two or more appliances associated with the units or stations of the multiuse home station 100 will also receive power (e.g., by way of a charging station for each).

The multiuse home station 100 may be operable to convert power from alternating current to direct currant and/or vice versa. For example, one appliance that may be powered by the multiuse home station 100 may need direct current, while another appliance powered by the multiuse home station 100 may need alternating current.

The powered multiuse home station 100 may include one or more charging stations 142, each including at least one coupling 144 through which to provide electrical power (e.g., to an appliance) from the power cord 136 and/or on-board energy storage member(s) 138. As exemplified, charging stations 142 have electrical coupling members that engage mating electrical coupling members provided on an appliance that is docked at the multiuse home station 100. Alternately, or in addition, a charging station may have an electrical outlet (e.g., a power output unit 140) which may removably receive a power cord from an appliance (e.g., a 110V/240V power cord, a 12V power cord, a USB power cord or the like. Alternately, or in addition, a charging station may have a wireless charging pad for, e.g., a tablet, smart phone, flashlight, or the like.

Accordingly, the first charging station 146 may include a first charging coupling 150 (e.g., electrical contacts, a USB port or a wireless charging pad) configured to be joined to the first appliance 114 (e.g., the autonomous surface cleaning apparatus 116 as exemplified in FIG. 2) when the first appliance is hooked up to the first charging station 150 (e.g., the autonomous surface cleaning apparatus 116 is docked to the multiuse home station 100). The second station 148 may include a second charging coupling 152 configured to be joined to the second appliance 120 (e.g., a smartphone 154, in the illustrated example of FIG. 2) when the second appliance 120 is hooked up to the second charging station 148 (e.g., second charging coupling 152 may be a Lightning connector, a mini USB power cord or the like or optionally the second station 148 may be a wireless charging pad).

An Autonomous Surface Cleaning Apparatus

In accordance with this aspect, the multiuse home station 100 includes at least one unit or station associated with an autonomous surface cleaning apparatus. The multiuse home station 100 may include a charging station and/or a docking station for the autonomous surface cleaning apparatus. Optionally, the docking station includes a charging station. This aspect may be used by itself or in combination with one or more of the other aspects set out herein.

An advantage of this aspect is that a docking station for an autonomous surface cleaning apparatus 116 typically includes an air treatment member and a suction motor that is used to evacuate dirt from the autonomous surface cleaning apparatus 116 when it is docked and therefore these components may be used as part of unit that performs a function of a household appliance, such as a room air cleaner or air purifier.

Additionally, or alternatively, docking station for an autonomous surface cleaning apparatus 116 is generally placed on the floor of a room with easy access to the surface to be cleaned (e.g., in a corner of a room or against a wall), which may also be a convenient location for a unit or station for use with another appliance (e.g., a screen of a television).

Figure 3:
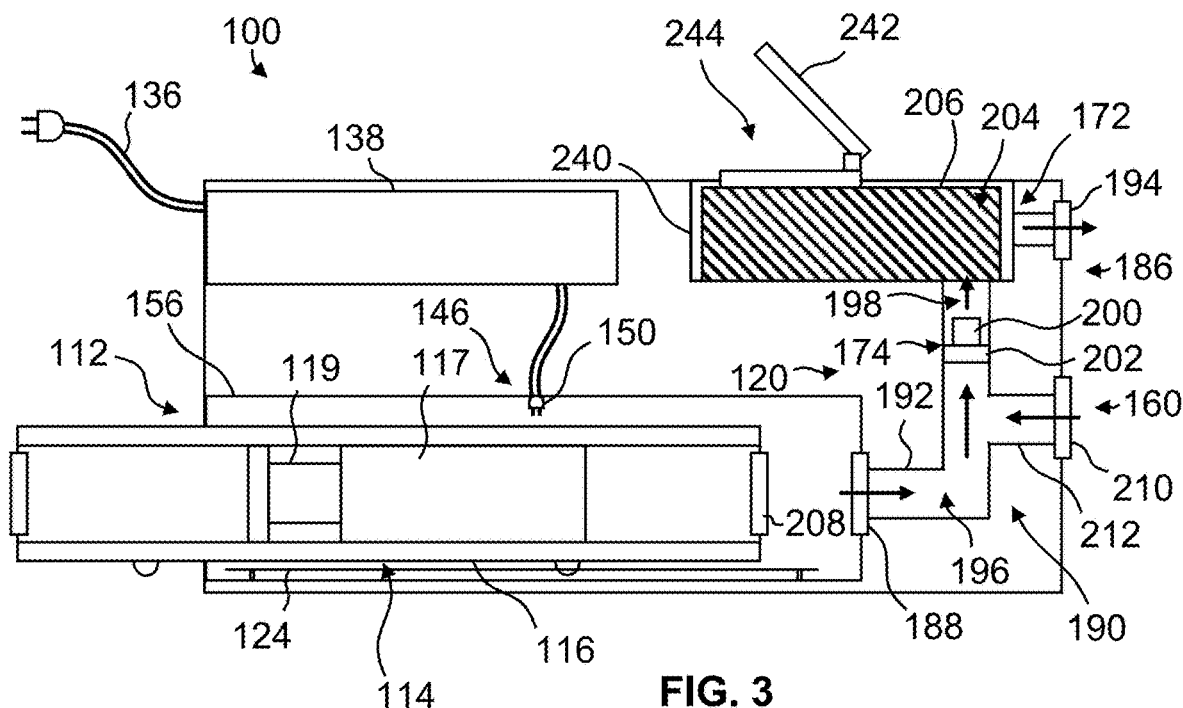
FIG. 3 is a schematic diagram of an alternate embodiment of a multiuse home station.

In the exemplary embodiment of FIG. 3, the multiuse home station 100 includes two stations (the charging station 146 and the docking station 112) associated with the autonomous surface cleaning apparatus 116. In the exemplary embodiment of FIG. 3, the docking station 112 and the charging station 146 are combined into a combination station 156, such that the charging port 150 is operable to be electrically coupled to the autonomous surface cleaning apparatus 116 when the autonomous surface cleaning apparatus 116 is positioned in the cradle 124.

As exemplified in FIG. 3, the multiuse home station 100 also includes a unit or station of and/or for use with another appliance. In the illustrated example of FIG. 3, the other appliance is a room air cleaner unit 160, described further elsewhere herein. In other examples, the multiuse home station 100 may also or alternatively include a unit or station associated with a different appliance, such as a unit or station associated with a central vacuum cleaner 162 (FIG. 4), a hand vacuum cleaner 166 (FIG. 5), and a stick vacuum cleaner 168 (FIG. 6).

Two Surface Cleaning Appliances

In accordance with this aspect, the multiuse home station 100 has two stations, each of which is adapted to interface with a surface cleaning apparatus. Optionally, the two surface cleaning apparatus are different types of surface cleaning apparatus for performing different cleaning tasks. Optionally, the first surface cleaning apparatus 114 is configured for cleaning a floor and the second surface cleaning apparatus 120 is configured for above floor cleaning. The multiuse home station 100 may include an above floor inlet for receiving dirt from the above floor cleaning appliance. This aspect may be used by itself or in combination with one or more of the other aspects set out herein.

An advantage of this aspect is that many surface cleaning appliances are designed for a particular type of cleaning. Often, a user will have at least two cleaning appliances, and the cleaning appliances may be meant for different types of tasks. For example, one cleaning appliance may be meant for cleaning floors and another meant for above floor cleaning, or one cleaning appliance for basic daily cleaning and another for more thorough but less frequent cleaning, or one cleaning appliance for automated cleaning and another for manual cleaning.

Figure 4:
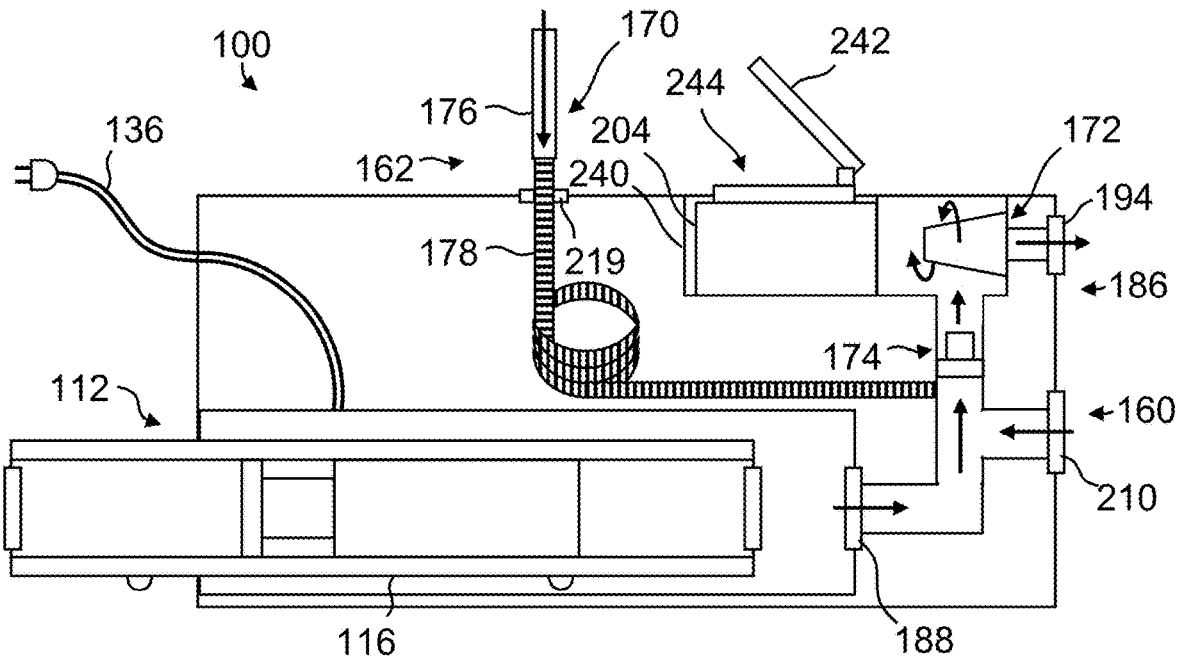
FIG. 4 is a schematic diagram of an alternate embodiment of a multiuse home station.
Figure 5:
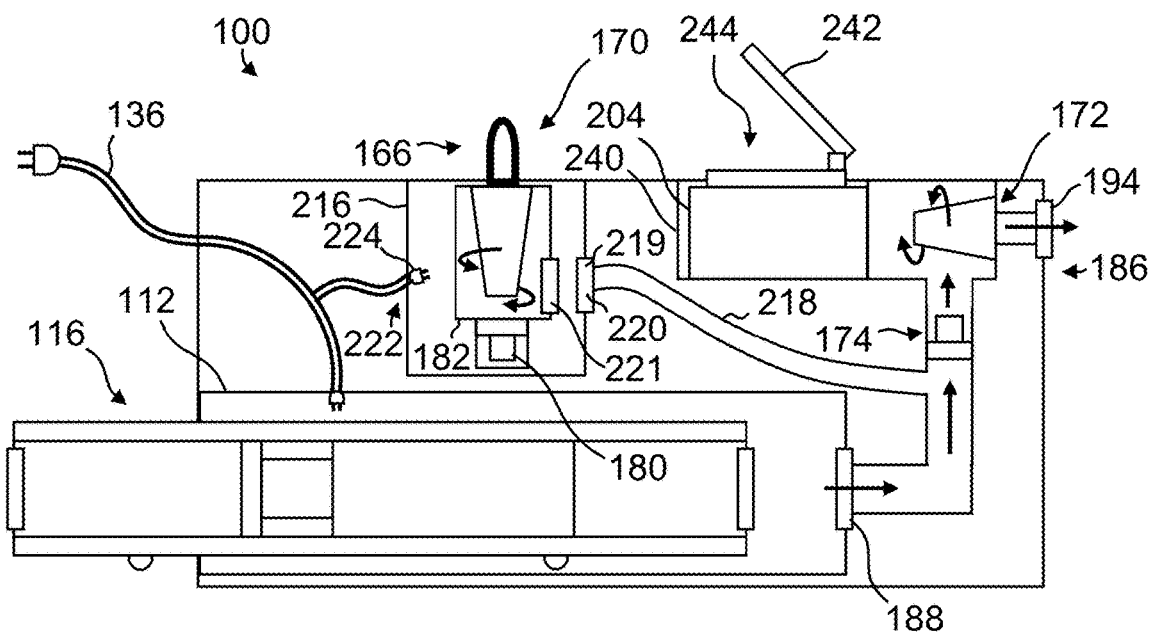
FIG. 5 is a schematic diagram of an alternate embodiment of a multiuse home station.
Figure 6:
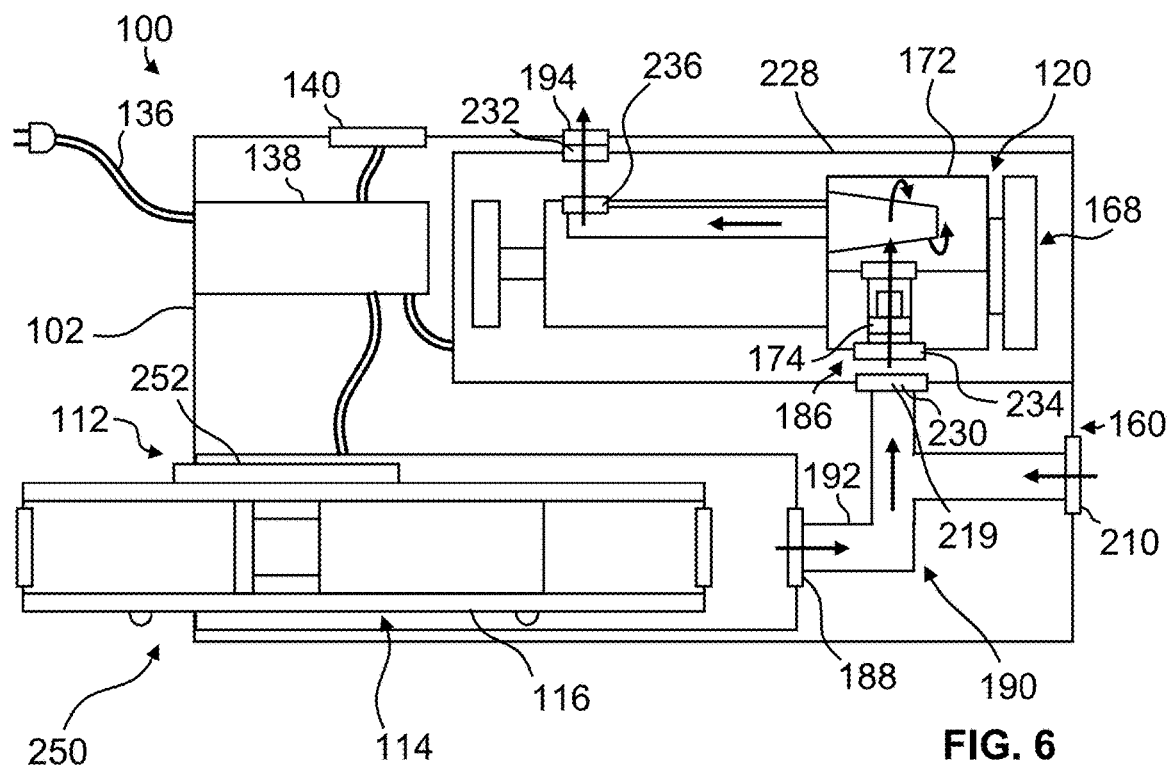
FIG. 6 is a schematic diagram of an alternate embodiment of a multiuse home station.

A multiuse home station 100 having at least one unit or station associated with a first surface cleaning apparatus and at least one other unit or station associated with another surface cleaning apparatus is exemplified in FIGS. 4 to 6. FIGS. 4 to 6 illustrate the multiuse home station 100 having at least one station for use with the autonomous surface cleaning appliance 116, and at least one station for use with another type of surface cleaning apparatus (a central vacuum cleaner 162 in FIG. 4, a hand vacuum cleaner 166 in FIG. 5, and a stick vacuum cleaner 168 in FIG. 6). Accordingly a docking station for an autonomous surface cleaning appliance 116 may have a first docking station for the autonomous surface cleaning appliance 116 (which is designed to only clean floors) and a second docking or charging station for a second type of surface cleaning apparatus which can clean above the floor.

While each of FIGS. 4 to 6 show the multiuse home station 100 with at least one station for use with the autonomous surface cleaning apparatus 116, it is to be understood that in some examples the multiuse home station 100 does not include a unit or station for use with the autonomous surface cleaning apparatus 116 (i.e., neither the first nor the second station is associated with an autonomous surface cleaning apparatus and accordingly, e.g., the first appliance 114 may be the central vacuum unit 162 and the second appliance 120 may be the hand vacuum cleaner 166).

Optionally, as exemplified in FIG. 4, at least one of the first appliance 114 and the second appliance 120 is an above floor cleaning apparatus 170 (e.g., the central vacuum unit 162 of FIG. 4 or the hand vacuum cleaner 166 of FIG. 5). An above floor cleaning apparatus is configured (e.g., sized and shaped) to be raised by, optionally, a single hand of a user to easily be applied to above-floor surfaces, and is used with an above floor inlet 219 of the multiuse home station 100. The above floor inlet 219 is provided to receive the dirt from the above floor cleaning unit 170 into the body 102 of the multiuse home station 100. The above floor inlet 219 may be spaced from the bottom end 110 (i.e., above a floor on which the bottom end 110 of the home station 100 rests). In the exemplary embodiment of FIG. 4, the first appliance 114 is the autonomous surface cleaning apparatus 116 (which makes use of the shared air treatment member 172 and/or shared air movement member 174 via the docking station 112, as described further elsewhere herein) and the secondary vacuum unit 120 is the central vacuum unit 162 (FIG. 4 also shows a unit associated with an optional third cleaning appliance, in this case the room air cleaner unit 160).

As exemplified, the central vacuum unit 162 includes a flexible hose 176 and a rigid cleaning wand 178 joined to the shared air treatment member 172 and/or shared air movement member 174 via the flexible hose 176. The flexible hose 176 may be stored in a compartment in the multiuse home station 100 and accordingly, the downstream end of the flexible hose 176 may be connected to a portion of a fluid flow path in the multiuse home station 100 even when the flexible hose 176 is not in use. The flexible hose 176 may be connectable in air flow communication with the suction motor of the multiuse home station 100 by any means known in the vacuum cleaner arts. The rigid wand may be stored in or on the multiuse home station 100. Accordingly, a user may raise the rigid cleaning wand to an above floor surface, and operate the multiuse home station 100 to draw an air flow through the rigid cleaning wand 178 and flexible hose 176 to clean the above floor surface.

As exemplified in FIG. 5, the above floor cleaning apparatus may be the hand vac unit 166. The hand vac unit may be a surface cleaning apparatus having an on board air movement member 180 and air treatment member 182. The hand vac apparatus may be portable and cordless (i.e., having at least one on board energy storage member(s)), and may be sized and shaped to be held comfortably in one hand of the user for above floor cleaning.

Optionally, the multiuse home station 100 may be configured for use with wet and/or dry surface cleaning appliances. For example, the multiuse home station 100 may include a docking station for a carpet extractor and may include a waterproof pocket or container to hold water drawn in by the carpet extractor.

Shared Air Moving Member and/or Air Treatment Member

In accordance with this aspect, the multiuse home station 100 includes at least one air moving member and/or air treatment member that is useable by at least two appliances, incorporated as one or more components in two different units and/or useable by an appliance and also incorporated as one or more components in a unit. For example, at least one of an air moving member and an air treatment member may be fluidly coupled to one or more of a station associated with a first appliance, a station associated with a second appliance, incorporated as one or more components in a first unit and incorporated as one or more components in a second unit. This aspect may be used by itself or in combination with one or more of the other aspects set out herein.

An advantage of this aspect is that the multiuse home station 100 may have at least one fewer air moving member and/or air treatment member than would otherwise be needed. This may result in, e.g., reduced space requirements, reduced operating costs, or acquisition costs.

This is exemplified in FIG. 3, in which the multiuse home station 100 includes an air treatment and air movement unit 186, an autonomous surface cleaning apparatus docking station port 188 and an air flow passage network 190. Using the air flow passage network 190, the air treatment and air movement unit 186 can be fluidically coupled to an autonomous surface cleaning apparatus 116 to remove dirt collected in the autonomous surface cleaning apparatus 116 and store it in the multiuse home station 100. In addition, using the air flow passage network 190, the air treatment and air movement unit 186 can be part of a room air cleaner unit 160.

As exemplified, the air flow passage network 190 includes an air flow passage 192 from the autonomous surface cleaning apparatus docking station 112 (specifically, from the docking station port 188) to a clean air outlet 194. The air treatment and air movement unit 186 is provided in the air flow passage 192. The air flow passage 192 includes a first upstream portion 196 extending between the docking station port 188 and the air treatment and air movement unit 186. The air flow passage 192 also includes a first downstream portion 198 extending between the air treatment and air movement unit 186 and the clean air outlet port 194.

As exemplified, the air treatment and air movement unit 186 includes an air movement member 174 and an air treatment member 172. In the exemplary embodiment of FIG. 3, the air movement member 174 includes a suction motor 200 and a fan 202 coupled to the suction motor 200 to be rotationally driven by the suction motor 200. As exemplified, the air movement member 174 is positioned upstream of the air treatment member 172 and, accordingly, may use a dirt air motor (i.e. a motor which is designed to enable air with entrained dirt to flow therethrough). In other embodiments, the air movement member 174 may be positioned downstream from the air treatment member 172 and may therefore be a clean air motor. It will be appreciated that any apparatus which can induce an air flow through the air flow passage network 190 may be used, such as a PL turbine.

The air treatment member 172 may be configured to remove particles (e.g., dust and/or water) from an air flow. The air treatment member 172 of the exemplary embodiment of FIG. 3 is a filter bag 206 (which in this case is also a collection bag 204). The filter bag 206 may be effective and easy to replace, however in other embodiments other air treatment members may be used. For example, the air treatment member may be a cyclone, which may have a dirt collection region interior of the cyclone chamber or exterior to the cyclone chamber, a momentum separator having a dirt collection region, one or more filter media or the like. It will be appreciated that any air treatment member 172 known in the robot docking station arts or the air cleaner arts may be used.

In the exemplary embodiment of FIG. 3, the docking station 112 is configured to make use of the air treatment and air movement unit 186 to evacuate the autonomous surface cleaning apparatus 116 when the autonomous surface cleaning apparatus 116 is docked. For example, the autonomous surface cleaning apparatus 116 may be docked when an outlet port 208 of the autonomous surface cleaning apparatus 116 is fluidically coupled to the docking port 188 (e.g., sealingly engaged such that air entrained with dirt may be drawn out of the apparatus 116) and/or when the autonomous surface cleaning apparatus 116 is held by the cradle 124. For example, when the autonomous surface cleaning apparatus 116 has returned to the docking station 112, the cradle 124 may secure the autonomous surface cleaning apparatus 116 in position in the docking station. The cradle 124 may secure the autonomous surface cleaning apparatus in a position in which the outlet port 208 abuts the docking port 188. The docking station 112 may optionally subsequently open the outlet port 208 (e.g. by way of a mechanical ram or using a suction force) and utilize the air treatment and air movement unit 186 to draw dirt out of the autonomous surface cleaning apparatus 116. The air treatment and air movement member 186 may remove the dirt from the air flow drawn from the autonomous surface cleaning apparatus prior to the air flow being directed by the passage network 190 out through the clean air outlet 194.

The room air cleaner unit 160 of the exemplary embodiment of FIG. 3 also utilizes the air treatment and air movement unit 186. The room air cleaner unit 160 includes a room air inlet 210. The room air inlet 210 opens into the room or space in which the multiuse home station 100 is located. Accordingly, the room air cleaner unit 160 is able to draw in air from the room or space in which the multiuse house unit 100 is located by utilizing the air treatment and air movement unit 186 fluidly coupled to the room air inlet 210 to draw in air through the room air inlet 210. In the exemplary embodiment of FIG. 3, the room air cleaner unit includes a second air flow passage 212 extending from the room air inlet 210 towards the air treatment and air movement unit 186. The room air inlet 210 is thus fluidly coupled to the air treatment and air movement unit 186 by way of the second air flow passage 212. In the exemplary embodiment of FIG. 3, the second air flow passage 212 is joined to the first upstream portion 196 of the air flow passage 192. Accordingly, the room air cleaner unit 160 may utilize the air treatment and air movement unit 186 to draw air into the multiuse home station 100 through the room air inlet 210, clean the air (e.g., by passing the air flow through the filter bag 206 to remove at least some debris), and then expel the cleaned air through the clean air outlet 194 back into the room or space in which the multiuse home station 100 is located.

Optionally, the room air cleaner unit 160 also includes one or more additional or alternative air treatment member (e.g., a HEPA filter, charcoal filter, and/or air ionizer), which is optionally not usable by any other appliance associated with the multiuse home station 100 (e.g., located in the passage 212 at a location upstream of where the passage 212 joins the air flow passage 192). Alternately, or in addition, a filter such as a HEPA filter, charcoal filter, and/or air ionizer may be provided downstream of air treatment member (or as a downstream part of air treatment member 172) so that air which is used to draw dirt out of the autonomous surface cleaning apparatus 116 is also filtered before exiting via clean air outlet 194.

The example of FIG. 3 shows the multiuse home station 100 configured such that the room air cleaner unit 160 and the autonomous surface cleaning apparatus 116 each make use of both the air treatment member 172 and the air movement member 174. However, in some examples the multiuse home station 100 is configured such that the first appliance 114 and the second appliance 120 use the same air movement member 174 and different air treatment members, or use the same air treatment member 172 and different air movement members 174. For example, the room air cleaner unit 160 may use the air treatment and air movement unit 186 only to move air, and may use a separate air treatment member (e.g., a HEPA filter, charcoal filter, and/or air ionizer) to clean an air flow. Accordingly, the multiuse home station 100 may include a bypass air flow passage extending between the air movement member 174 and the clean air outlet 194 (downstream of the suction motor 200 and the fan 202 and upstream of the clean air outlet 194) such that air travelling through the room air cleaner unit does not pass through the air treatment member 172.

Alternately or in addition, the multiuse home station 100 may include a bypass air flow passage which bypasses the air movement member 174 (e.g., if an on-board air movement member 119 of the autonomous surface cleaning apparatus 116 is used to move dirt-entrained air out of the autonomous surface cleaning apparatus 116 to evacuate the autonomous surface cleaning apparatus 116). Accordingly, the bypass passage may extend between the docking station port 188 and the air treatment member 172 without passing through the air movement member 174. The bypass passage may use part of the first upstream portion 196 and/or the first downstream portion 198.

As exemplified in FIG. 5, the multiuse home station 100 may include the air treatment and air movement unit 186 configured to be made use of by two or more removable appliances. Each of the appliances may make use of the air treatment and air movement unit 186 when docked. For example, the multiuse home station 100 may be configured to evacuate a dirt receiving region in each of the appliances. In the illustrated embodiment of FIG. 5, the autonomous surface cleaning apparatus 116 makes use of the air treatment and air movement unit 186 when docked at the docking station 112 (i.e., the autonomous surface cleaning apparatus 116 can be evacuated when docked at the docking port 188). The multiuse home station 100 embodiment illustrated in FIG. 5 also includes a hand vac docking station 216 for receiving the hand vac 166. The air passage network 190 includes a second air flow passage 218 extending from a hand vac inlet 220 of the hand vac docking station towards the air treatment and air movement unit 186. An outlet port 221 of the hand vac 166 (which may also be the nozzle of the hand vac) may be joined to the hand vac inlet 220 (e.g., sealingly engaged such that dirt-entrained air may be drawn out of the hand vac 166 to evacuate the hand vac 166). Accordingly, the hand vac 166 may also be evacuated by the multiuse home station 100. In the illustrated example of FIG. 5, the multiuse home station 100 also includes a hand vac charging station 222 with a charging coupling 224 (integrated with the docking station 216 in the illustrated example).

In some examples, the shared air treatment member 172 and/or shared air movement member 174 may be on-board at least one appliance that is removably mountable to the multiuse home station 100. As exemplified in FIG. 6, a second appliance 120 is fluidly coupled to the multiuse home station 100 (i.e., to the air flow passage network 190). For example, the second appliance 120 may be a vacuum cleaner that comprises the air treatment member 172 and the air moving member 174. For example, the second appliance 120 may include all of the components of a vacuum cleaner and therefore may function as a vacuum cleaner when removed from the multiuse home station 100. Accordingly, the vacuum cleaner may be a canister vacuum cleaner, an upright vacuum cleaner, a stick vacuum cleaner 168 (see FIG. 6), a hand vac 166 (see FIG. 5) or the like. Alternately, instead of the components comprising a second appliance 120, the components may comprise only some of the components of a vacuum cleaner and may therefore be a vacuum cleaner unit that comprises one or more of the air treatment member 172, the air moving member 174 and the hose 178. The vacuum cleaner unit may be removably mounted into a housing and, when combined with the housing, provides a vacuum cleaner or extractor.

The vacuum cleaner or vacuum cleaner unit may be removably mounted to the multiuse home station 100 so as to be fluidically connected to the multiuse home station 100. As exemplified in FIG. 6, the second appliance 120 is docked in a pass-through docking station 228 of the multiuse home station 100. The air flow passage network 190 includes an upstream air outlet 230 and a downstream air inlet 232 so that the air flow passage network 190 may extend through the second appliance 120 when the second appliance is docked in the pass-through docking station 228. The second appliance includes an upstream air inlet 234 configured to engage (e.g., sealingly engage) with the upstream air outlet 230 of the air flow passage network 190. The second appliance 120 also includes a downstream air outlet 236 configured to engage (e.g., sealingly engage) with the downstream air inlet 232. Accordingly, the on board air flow passage extending from the upstream air inlet 234 to the downstream air outlet 236 is in fluid communication with the air flow passage 192 when the second appliance 120 is docked in the pass-through docking station 228 and may therefore be part of the air flow passage network 190.

As exemplified in FIG. 6, the multiuse home station 100 is configured such that another appliance may make use of one or both of on-board air treatment member 172 and/or air movement member 172 of the second appliance 120. In the exemplary embodiment of FIG. 6, the autonomous surface cleaning apparatus 116 and the room air cleaner unit 160 are each able to make use of both the on-board air treatment member 172 and the air movement member 174 of the second appliance 120. Accordingly, the on-board members 172, 174 of, e.g., the stick vacuum 168 may be used to evacuate the autonomous apparatus 116 and/or move air through the room air cleaner 160.

The room air inlet 210 and the autonomous surface cleaning apparatus docking port 188 are each upstream of the upstream air outlet 230 and joined to the upstream air outlet 230 through the air passage network 190. Accordingly, when the air movement member 174 of the second appliance 120 of the embodiment of FIG. 6 draws air from the upstream air outlet 230, the air may be drawn into the air passage network 190 through one or both of the room air inlet 210 and the autonomous surface cleaning apparatus docking port 188. The air treatment member 172 of the second appliance 120 is configured to separate dirt from the air flow generated by the air movement member 174 of the second appliance 120 (e.g., the air treatment member 172 may be, as illustrated in FIG. 6, a cyclone to remove particulate matter from the air flow).

It will be appreciated that suitable valves may be provided to enable air to flow through only part of the air flow passage network 190 when different appliances or different units are operated.

Shared Dirt Receiving Region

In accordance with this aspect, the multiuse home station 100 includes a shared dirt receiving region 240 (see for example FIG. 4). As discussed previously with respect to the air movement member 174 and the air treatment member 172, the shared dirt receiving region 240 may be useable by at least two appliances, incorporated as a component in two different units and/or useable by an appliance and also incorporated as a component in a unit. This aspect may be used by itself or in combination with one or more of the other aspects set out herein.

An advantage of this aspect is that a user may be able to dispose of dirt from more than one appliance by emptying or removing only the one shared dirt receiving region 240.

In some examples, dirt removed by at least one appliance is collected directly in the dirt receiving region 240, which may be the collection bag 204. For example, dirt collected by the room air cleaner unit 160 may be collected in the collection bag 204, and dirt evacuated from the autonomous surface cleaning apparatus 116 may also be moved into the collection bag 204.

In some examples, the first appliance 114 and the second appliance 120 each collect dirt in their own collection regions, and then the multiuse home station 100 is configured to gather dirt from the first appliance 114 and the second appliance 120 into one common dirt receiving region 240. For example, the dirt collected by the autonomous surface cleaning apparatus 116 and the dirt collected by the hand vac 166 (FIG. 5) may be drawn into the dirt receiving region 240 of the multiuse home station 100 when the two appliances are docked.

The shared dirt receiving region 240 in the multiuse home station 100 may also be easier to access for a user than a dirt receiving region in an appliance. Since the size of the multiuse home station 100 may be less important than the size of the appliances, the multiuse home station 100 may also be able to incorporate one or more additional features to make the shared dirt receiving region 240 easier to use. For example, the shared dirt receiving region 240 may be positioned to be readily accessible from an upper end 108 of the station 100, e.g., by opening a lid 242 and removing the dirt receiving region 240 or by merely pulling the dirt receiving region 240 upwardly using an optional handle. The station 100 may also or alternately be configured to gather dirt into a single, removable container or bag and optionally seal the single container or bag to avoid contact between the dirt and the user, as described further elsewhere herein.

As in the exemplary embodiment of FIG. 3, the multiuse home station 100 may gather the dirt into the filter bag 206 or another collection bag 204 or container, and the user can then remove the filter bag 206 and dispose of that. A bag may be easier to dispose of than loose dirt that the user needs to empty into a garbage.

Optionally, the multiuse home station 100 may be configured such that the shared dirt receiving region 240 is also useable as a room garbage can 244. For example, when the openable lid 242 is opened, the dirt receiving region 240 may be opened. The dirt receiving region 240 may be sized for use with a household garbage bag (e.g., a bag having a volume of at least 40 liters, at least 50 liters, or at least 60 liters).

The collection bag 204 may be a sealable bag (e.g., a wax paper bag or other non-porous bag). The sealable bag may keep dirt from escaping from the bag as the user disposes of the bag. In some examples, the multiuse home station 100 is configured to seal the sealable collection bag 204 before the user touches the bag. For example, the multiuse home station 100 may be configured to close and seal the bag in response to an indication from the user that they are ready to remove the bag 204 from the multiuse home station 100. The user may then open the lid 242 and retrieve the bag 204 without ever having to touch the collection bag 204 while the collection bag 204 is open.

Optionally, the collection bag 204 used by the multiuse home station 100 (e.g., the sealable bag) is biodegradable.

It will be appreciated that the dirt receiving region 240 may be any dirt collection region known in the vacuum cleaner or room air cleaner arts. Accordingly, it may be a rigid container that is or comprises a momentum separator, a cyclone separator, or the like.

Disinfection

In accordance with this aspect, the multiuse home station 100 may include a disinfection unit. The disinfection unit may be configured to generate and/or use a disinfectant agent (e.g., one or more of an alcohol solution, ozone (e.g., aqueous ozone), ultraviolet radiation, peroxide, vital oxide, quaternary ammonium, or ions from an air ionizer). This aspect may be used by itself or in combination with one or more of the other aspects set out herein.

An advantage of this aspect is that the multiuse home station 100 may be able to disinfect a surface (e.g., a surface of an appliance or a surface in a room such as a floor or wall) and/or provide the disinfectant agent to an appliance. For example, the multiuse home station 100 may be operable to disinfect the handle of the hand vac 166 (FIG. 5) when the hand vac 166 is docked in the docking station 216, or provide aqueous ozone to a steam mop.

The disinfection unit may be or include, e.g., a sprayer operable to spray a fluid such as an alcohol solution or aqueous ozone and/or a surface contact member operable to apply a fluid such as an alcohol solution or aqueous ozone (e.g., an absorptive member such as a mop or pad to be soaked in the fluid and applied to the surface, or an extending member along which a fluid can flow to be guided to a surface). Additionally, or alternatively, the disinfection unit may be or include an ozone generator, a mixing unit operable to mix chemicals to produce a disinfection agent, a lamp operable to generate ultraviolet radiation and apply the ultraviolet radiation to adjacent surfaces, or an air ionizer operable to ionize adjacent air.

The multiuse home station 100 may include at least one sealed pocket or wet bin to hold a fluid disinfectant to allow an appliance or a portion of an appliance to be submerged for disinfection. For example, the multiuse home station 100 may include a sealed pocket in which the stick vacuum can be placed to disinfect and/or deodorize the stick vacuum.

Alternately or in addition the disinfection unit may be operable to disinfect air that travels through part or all of the air flow passage network 190. Accordingly, if the multiuse home station 100 incorporates a room air cleaner unit, the disinfection unit may be used to treat (e.g., sterilize or purify) air that is drawn in from the room and treated by the room air cleaner unit before being returned to the room.

The disinfectant agent may be applied during a low-traffic time period. The low-traffic time period is a time period when the space in which the disinfectant agent is to be applied can be expected to be unoccupied, occupied by fewer individual than during other times, and/or occupied by individuals who are moving less than during other times. The low-traffic time period may be a preprogrammed time period and/or a learned time period (e.g., a time period determined via machine learning fed by data such as sensor data provided by motion sensors or other sensors of the multiuse home station 100). For example, the low-traffic time may include a work day time period (e.g., between 8:00 am and 5:00 pm or between 9:00 am and 5:00 pm) for a residential space when residents can be expected to be away at work. The low-traffic time period may include an overnight time period (e.g., between 11:00 pm and 7:00 am) for a residential space when residents can be expected to stay in bed. In another example, the low-traffic time may include an evening and/or morning time period (e.g., between 7:00 pm and 10:00 am) for, e.g., a commercial space, when occupants can be expected to have left for the day.

Applying the disinfectant agent during the low-traffic time period may reduce contact between individuals and the disinfectant agent. For example, liquid disinfectant applied to a surface by an autonomous surface cleaning apparatus may have time to dry before a human comes into contact with the surface. Alternatively, or additionally, applying the disinfectant agent during the low-traffic time period may reduce the need for application of the disinfectant agent to be paused to accommodate individuals. For example, application during low-traffic time periods may reduce automatic instances of ultraviolet radiation being shut off in response to detecting a human in the vicinity of the application site.

Incorporating a Detachable Appliance

In accordance with this aspect, a detachable appliance (e.g., the autonomous surface cleaning apparatus 116) may form a part of the multiuse home station 100. This aspect may be used by itself or in combination with one or more of the other aspects set out herein.

An advantage of this aspect is that the multiuse home station 100 may use the detachable appliance to operate remotely. For example, the multiuse home station 100 may use the detachable appliance to generate and/or use the disinfectant agent.

In the exemplary embodiment of FIG. 6, the detachable appliance 250 is the autonomous surface cleaning apparatus 116. The autonomous surface cleaning apparatus 116 includes the disinfection unit 252. For example, the autonomous surface cleaning apparatus 116 may include a sprayer operable to spray a fluid (e.g., an alcohol solution or aqueous ozone, which may be held in a reservoir on board) on a surface adjacent the autonomous surface cleaning apparatus 116. In another example, the autonomous surface cleaning apparatus 116 may include a reservoir of cleaning fluid and a surface contact member operable to direct the cleaning fluid from the reservoir and onto a surface adjacent the autonomous surface cleaning apparatus 116 (e.g., a brush having bristles along which the fluid can flow and which can be applied to the surface, or a mop or pad to be soaked in the fluid and applied to the surface).

Additionally, or alternatively, the disinfection unit 252 may be or include a lamp operable to generate ultraviolet radiation and optionally direct the ultraviolet radiation off board of the detachable appliance, or an air ionizer operable to ionize air adjacent the detachable appliance.

Recirculating Air

In accordance with this aspect, the multiuse home station 100 may be configured to selectively draw air from an upper end 270 of a room 272 or from a lower end 274 of the room and/or exhaust air to the upper end 270 of the room or to the lower end 274 of the room. This aspect may be used by itself or in combination with one or more of the other aspects set out herein.

An advantage of this aspect is that the multiuse home station 100 may draw air from the upper portion of the room when the room temperature is generally cooler than desired (e.g., in winter) and from the lower portion of the room when the room temperature is generally higher than desired (e.g., in summer).

Figure 7:
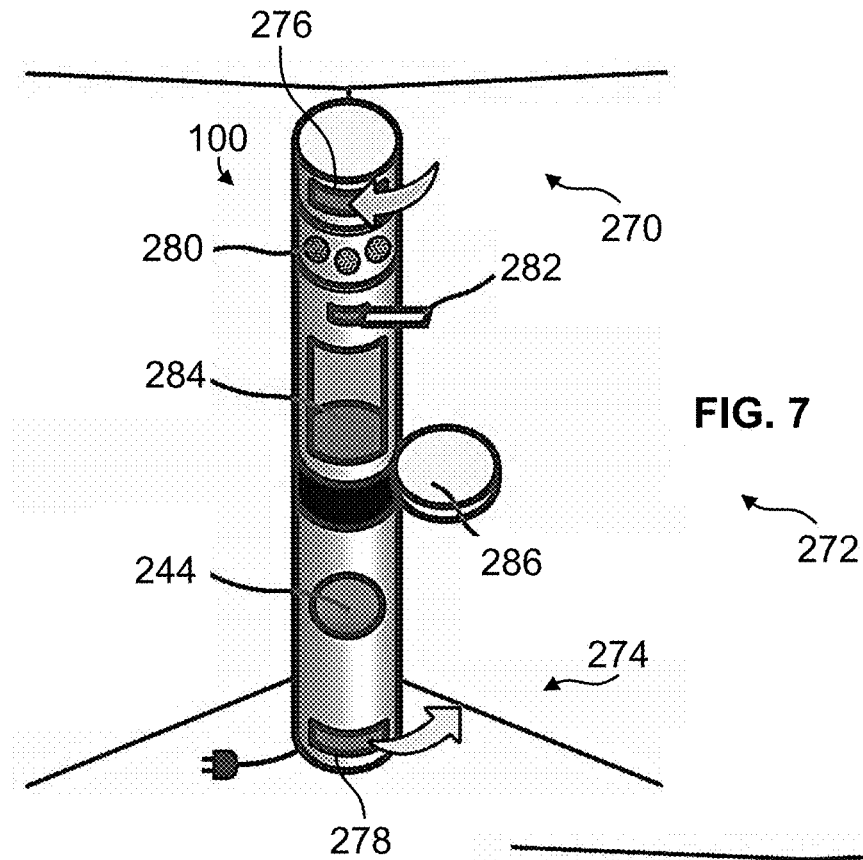
FIG. 7 is a perspective view of an alternate embodiment of a multiuse home station.
Figure 8:
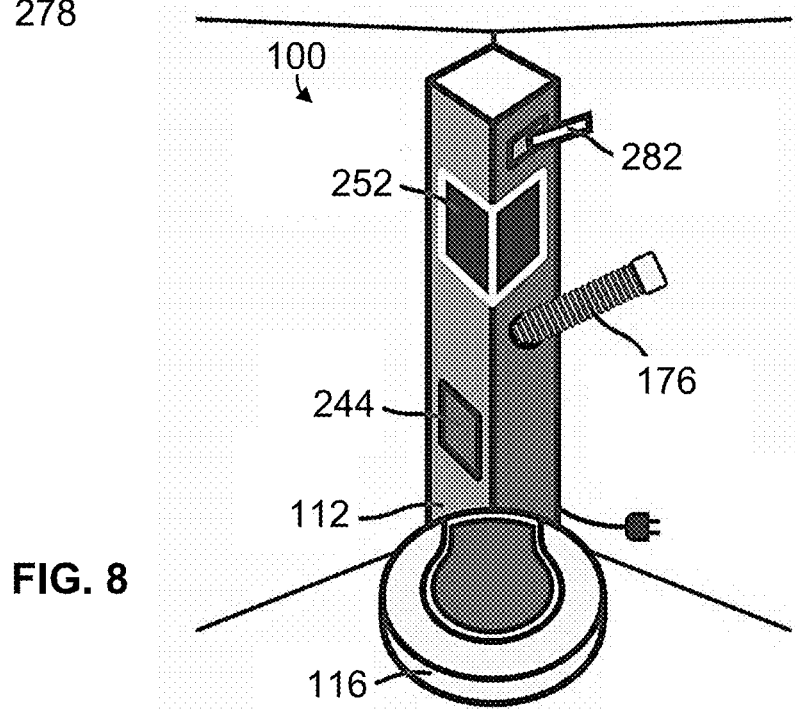
FIG. 8 is a perspective view of an alternate embodiment of a multiuse home station.

As exemplified in FIGS. 7 to 9, the multiuse home station 100 may include an upper port 276 between the air flow passage network 190 and the room and a lower port 278 between the air flow passage network 190 and the room. As exemplified, the multiuse home station 100 is vertically elongated, and the upper port 276 is at the top end 108 in the upper portion 270 of the room while the lower port 278 is at the bottom end 110 in the lower portion 274 of the room. The upper and lower ports each open into the air flow passage network 190 and may be fluidly coupled to the air movement member 174 or, optionally, an alternate air movement member that is not used to treat air drawn from a surface cleaning apparatus. For example, if the air movement member of a surface cleaning apparatus is used to transport dirt from the surface cleaning apparatus to the multiuse home station 100, then in such a case the multiuse home station 100 may have an air movement member 174 that is used to recirculate air, but not to draw dirt out of a docked surface cleaning apparatus.

One of the upper and lower ports may be the room air intake of the room air cleaner unit, while the other is the clean air outlet. Accordingly, the multiuse home station 100 may be operable to, in a first mode, draw air in through the upper port 276 and exhaust air out through the lower port 278 (e.g., to treat the air using the room air cleaning unit 160; i.e., the upper port 276 is the room air inlet 210 and the lower port 278 is the clean air outlet 194). Alternatively, the multiuse home station 100 may be operable to, in a second mode, draw air in through the lower port 278 and exhaust air out through the upper port 276 (e.g., to treat the air using the room air cleaning unit 160; i.e., the upper port 276 is the clean air outlet 194 and the lower port 278 is the room air inlet 210). The multiuse home station 100 may be operable to switch between modes (e.g., at different times of the year).

Optionally, the air may be treated as it passes between the upper and lower ports 276, 278. For example, the air may pass through the air treatment member 174 (or an alternate air treatment member that is not used to treat air drawn from a surface cleaning apparatus) as the air passes between the upper and lower ports 276, 278.

Alternately, or in addition, the multiuse home station 100 may be operable to heat or cool the air that it draws in. For example, the multiuse home station 100 may pass the air over a heater or a heat exchanger before exhausting the air, and the heat sink may be warmed to above the temperature of the space in which the multiuse home station 100 is located or cooled to below the temperature of the space in which the multiuse home station 100 is located.

A vertically elongated multiuse home station 100 may have space between the upper port 276 and the lower port 278 for one or more further stations or units. For example, FIG. 7 illustrates the multiuse home station 100 incorporating a speaker unit 280, a light fixture 282, a docking and charging station 284 for a stick vacuum, a retractable fold out induction charger table 286 (e.g., for charging a phone; optionally folded out so the phone is visible when charging), and the room garbage can 244.

FIG. 8 illustrates the multiuse home station 100 incorporating the light fixture 282, the disinfection unit 252 (in this case, to make $H_2O+O^3$ solution for disinfection), the central vacuum unit with the extendable hose 176, the room garbage can 244, and the docking station 112 for the autonomous surface cleaning apparatus 116.

Figure 9A:
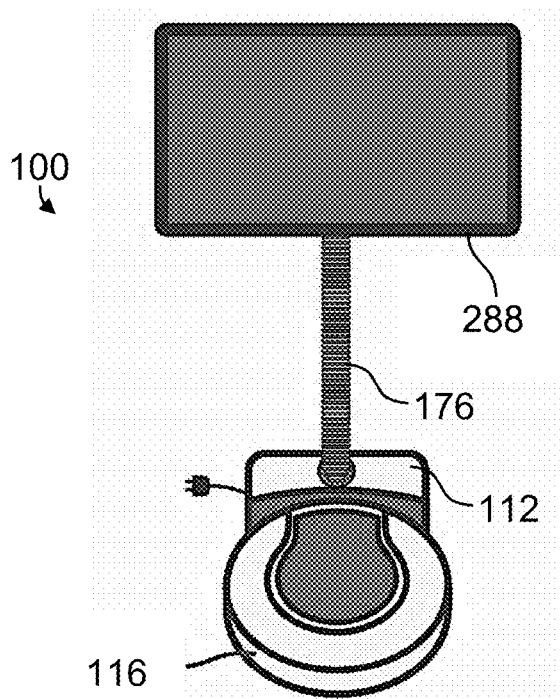
FIG. 9A is a front view of an alternate embodiment of a multiuse home station.
Figure 9B:
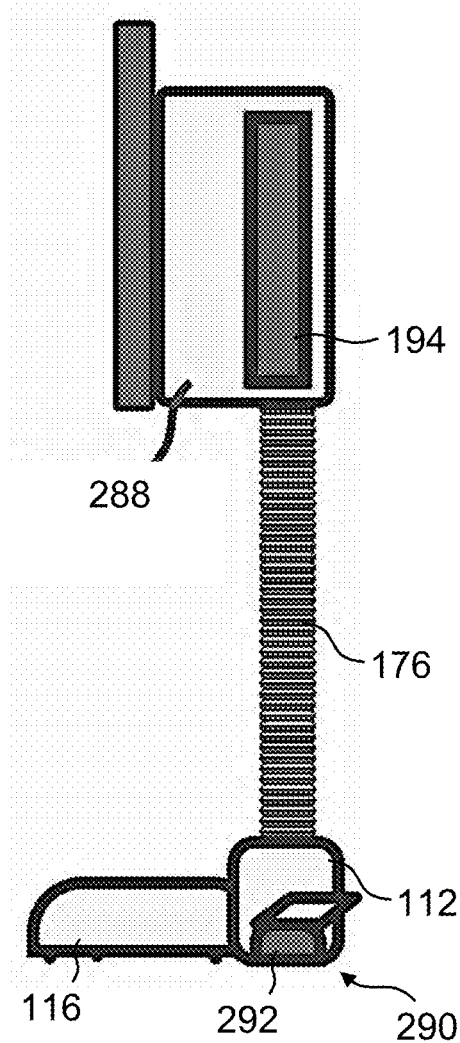
FIG. 9B is a side view of the multiuse home station of FIG. 9A.

FIGS. 9A and 9B illustrate the multiuse home station 100 incorporating a mount for a television screen 288 at the top end 108 and the docking station 112 for the autonomous surface cleaning apparatus 116 at the bottom end. In the exemplary embodiment of FIGS. 9A and 9B, the upper port is in the top end 108 adjacent the screen and the lower port is in the bottom end 110 adjacent the docking station 112, with the flexible hose 176 providing an air passage therebetween. A sweeping unit 290 is provided at the bottom end 110 and joined to the air treatment and air movement unit so that a user may sweep dirt into or near the sweeping module inlet 292 to be sucked into the multiuse home station 100 and out through the clean air outlet 194.

It will be appreciated that a multiuse home station 100 may incorporate any one or more of the components exemplified in FIGS. 7, 8 9A and 9B or any other component, such as a Wi-Fi repeater as discussed elsewhere herein.

Integrated into a Living Space

In accordance with this aspect, the multiuse home station 100 is integrated into a living space. The multiuse home station 100 may be shaped to fit underneath common furniture items (e.g., in a location that is at least partially out of sight while still providing direct access from the autonomous surface cleaning apparatus docking station to the floor). The multiuse home station 100 may be incorporate into common furniture items (e.g., the multiuse home station 100 may form a bookshelf or a stand for a television screen, such as the television screen of FIGS. 9A and 9B). This aspect may be used by itself or in combination with one or more of the other aspects set out herein.

An advantage of this aspect is that the multiuse home station 100 may be positioned in a convenient location (e.g., a location readily accessed by the user and/or in a position where an autonomous appliance is able to directly access the necessary surfaces) without appearing out of place or taking up additional space. For example, placing the multiuse home station 100 under furniture may hide the multiuse home station 100 and/or allow for positioning of the multiuse home station on a floor without increasing the total footprint of the furniture in the room.

Figure 10:
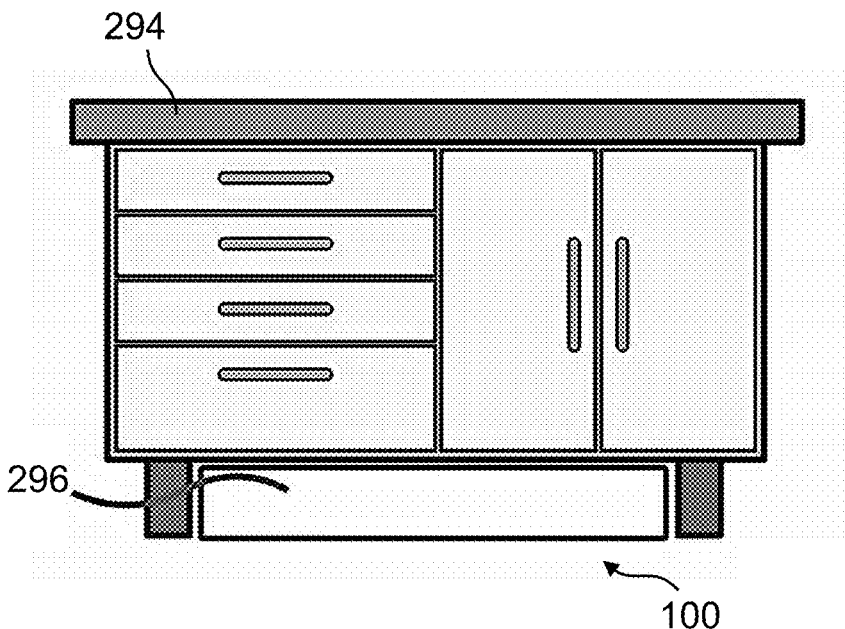
FIG. 10 is a front view of an alternate embodiment of a multiuse home station; and, FIG. 11 is a front view of an alternate embodiment of a multiuse home station.

As exemplified in FIG. 10, the multiuse home station 100 may be shaped to be positioned under a counter 294. The multiuse home station 100 may shaped to fit behind a kick plate 296 or may replace the kick plate (e.g., it may include the kick plate 296 as part of the multiuse home station 100).

Figure 11:
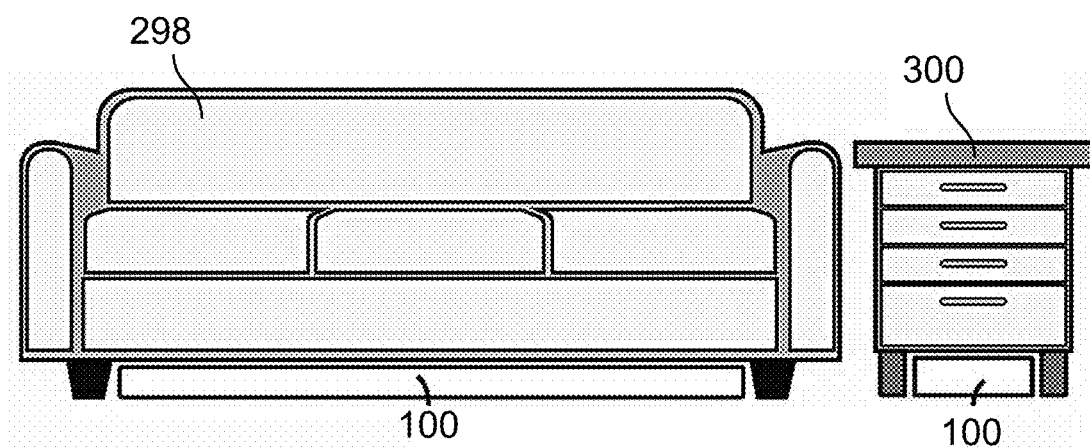

As exemplified in FIG. 11, the multiuse home station 100 may be shaped to be positioned under a sofa 298 and/or side table 300.

It will be appreciated that part of the multiuse home station 100 may extend upwardly from the floor and be positioned behind the furniture so that the total height of the multiuse home station 100 may be enlarged without the portions of the multiuse home station 100 behind the furniture being visible.

Modular

In accordance with this aspect, the multiuse home station 100 is a modular station. The multiuse home station 100 is configured to allow one or more (e.g., a plurality) of units or stations to be removed and replaced over the lifetime of the multiuse home station 100. This aspect may be used by itself or in combination with one or more of the other aspects set out herein.

An advantage of this aspect is that the multiuse home station 100 may be continuously used even as one or more units or stations break down or become outdated. Since the multiuse home station 100 incorporates a plurality of units or stations, replacing the entire multiuse home station 100 every time a component unit or station breaks could be cost-prohibitive.

As exemplified in FIG. 6, the multiuse home station 100 may include the autonomous surface cleaning apparatus docking station 112, the on-board energy storage device 138, and the docking station 228 for the stick vacuum 168. Each of these stations or units may be removable (e.g., held on by threaded fasteners, clips, or other releasable fasteners). Accordingly, if one breaks, the user may be able to remove the broken station or unit and replace it with another. The main housing 102 of the multiuse home station 100 may be durable and tough (e.g., formed of a metal such as steel, or a tough plastic). The air flow passage network 190 may also or alternatively be formed of a durable and tough material (e.g., a metal such as steel, or a touch plastic). One or more unit or station may be releasably securable in the main housing 102 with one or more ports (e.g., docking station port 188) opening into to the air flow passage network 190.

In some examples, components of a station or unit may be replaceable. For example, a motor, light, Wi-Fi repeater, or power supply may be releasably secured to the main housing 102 and/or air flow passage network 190 and may thus be removable and replaceable.

The multiuse home station 100 may include a backplane to enable different features to be incorporated and/or upgraded. For example, the multiuse home station 100 may start with two basic stations or units, and the user may be able to add on further stations or units or upgrade one or more stations or units as desired.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

The invention claimed is:

1. A multiuse home station comprising:
    (a) a surface cleaning apparatus docking station, the surface cleaning apparatus docking station comprises a first air flow passage from a surface cleaning apparatus docking station inlet to a clean air outlet with an air treatment and air movement unit provided in the first air flow passage, the air treatment and air movement unit comprises a suction motor and fan assembly and an air treatment member, wherein the air flow passage comprises a first upstream portion extending from the surface cleaning apparatus docking station inlet to a first downstream end at a location that is upstream of the air treatment and air movement unit, and a downstream portion extending between the air treatment and air movement unit and the clean air outlet, wherein the surface cleaning apparatus docking station inlet is always open;
    (b) a surface cleaning apparatus charging station;
    (c) a room air cleaner unit, wherein the room air cleaner unit comprises a second air flow passage extending from a room air cleaner unit air inlet to a second downstream end at the location that is upstream of the air treatment and air movement unit, and wherein the room air cleaner unit air inlet is always open; and,
    (d) a conduit defining a combined air flow passage, the conduit comprising an upstream end at the location and a downstream end at the air treatment and air movement unit wherein the first downstream end and the second downstream end merge at the upstream end of the combined conduit; and,
    wherein the multiuse home station is useable in a docking station mode in which air, that is drawn into the multiuse home station from a surface cleaning apparatus through the surface cleaning apparatus docking station inlet, travels through the first upstream portion and then the combined air flow passage to the air treatment and air movement unit prior to being exhausted through the clean air outlet, and
    wherein the multiuse home station is also useable in a room air cleaner mode in which air is drawn into the multiuse home station through the room air cleaner unit air inlet travels through the second air flow passage and then the combined air flow passage to the air treatment and air movement unit, and
    wherein the conduit has an inner wall that defines the combined air flow passage in both the docking station mode and the room air cleaner mode.

2. The multiuse home station of claim 1 wherein the air treatment member comprises a dirt receiving region and the multiuse home station further comprises an openable lid wherein, when the lid is opened, the dirt receiving region is opened whereby the dirt receiving region is useable as a room garbage can.

3. The multiuse home station of claim 1 further comprising a hand vac unit that comprises a hand vac docking station.

4. The multiuse home station of claim 3 wherein the hand vac docking station comprises a third air flow passage extending from a hand vac inlet and extending towards the air treatment and air movement unit whereby the hand vac unit utilizes the air treatment and air movement unit.

5. The multiuse home station of claim 3 wherein the hand vac docking station comprises a hand vac charging station.

6. The multiuse home station of claim 1 further comprising an above floor cleaning unit that comprises a rigid cleaning wand and a flexible hose, and a third air flow passage extends from an above floor inlet towards the air treatment and air movement unit wherein the above floor cleaning unit utilizes the air treatment and air movement unit.

7. The multiuse home station of claim 1 further comprising a secondary charging station.

8. The multiuse home station of claim 7 wherein the secondary charging station comprises a recharging station for at least one of a smart phone, a tablet, a flashlight, and a hand vacuum cleaner.

9. The multiuse home station of claim 7 wherein the secondary charging station comprises a USB port.

10. The multiuse home station of claim 7 wherein the secondary charging station comprises a wireless charging pad.

11. The multiuse home station of claim 1 further comprising a Wi-Fi repeater.

12. The multiuse home station of claim 1 further comprising a room light.

13. The multiuse home station of claim 1 further comprising a power output unit comprising a surge protected electrical outlet.

14. The multiuse home station of claim 1 further comprising the surface cleaning apparatus wherein the surface cleaning apparatus comprises a disinfection unit or an air cleaner unit.

15. The multiuse home station of claim 1 further comprising a secondary vacuum unit operable independently of the surface cleaning apparatus, wherein the secondary vacuum unit uses a portion of the surface cleaning apparatus docking station.

16. The multiuse home station of claim 15 wherein the secondary vacuum unit comprises a cordless portable vacuum cleaner.

17. The multiuse home station of claim 15 wherein the secondary vacuum unit comprises a flexible hose and wand assembly upstream of the air treatment and air movement unit.

* * * * *